O. REICHENBACH, Dec'd.,
Assignor to R. C. JENKINSON.
STAPLE AND LOCK FOR BAG FRAMES.
No. 10,383 Reissued Sept. 18, 1883.
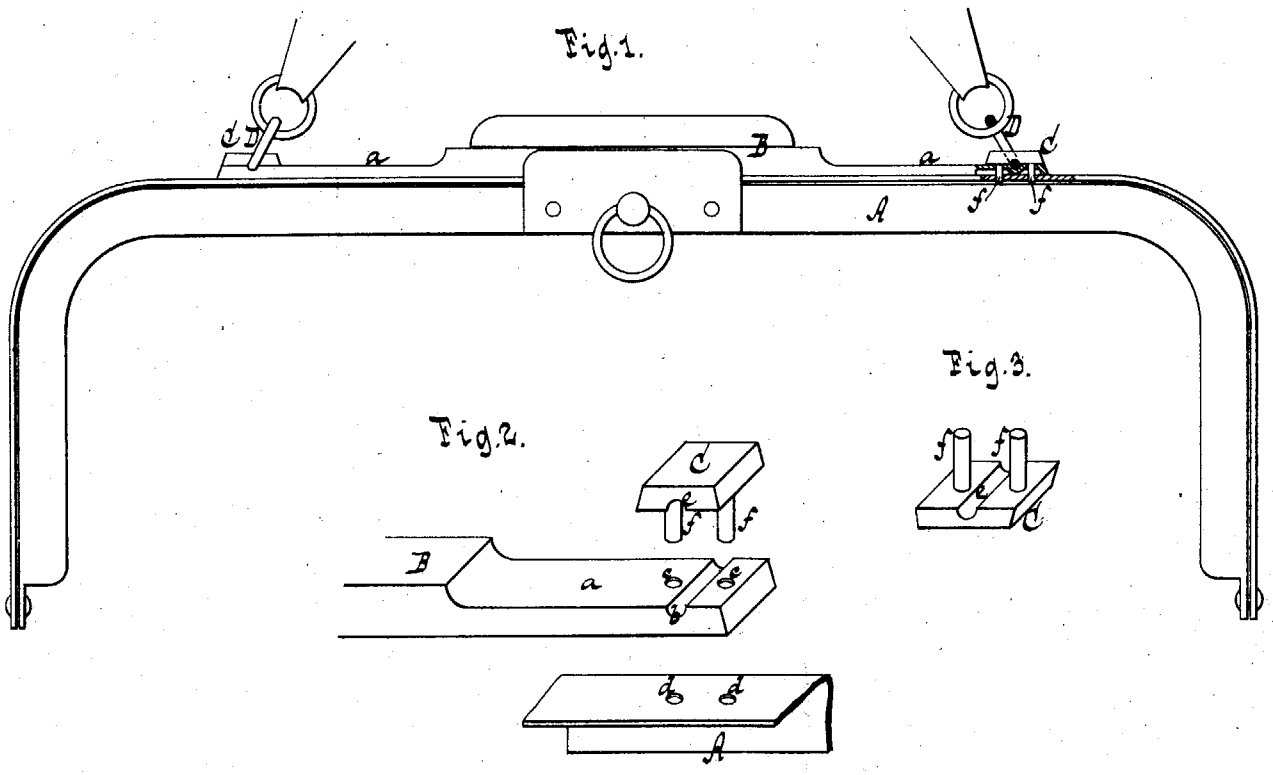
WITNESSES:
Otto Hufeland
William Miller
INVENTOR
Richard C. Jenkinson, assignee of Oscar Reichenbach, deceased
BY Van Santvoord & Sheriff
ATTORNEYS
N. PETERS, Photo-Lithographer, Washington, D. C.

UNITED STATES PATENT OFFICE.

RICHARD C. JENKINSON, OF NEWARK, NEW JERSEY, ASSIGNEE OF OSCAR REICHENBACH, DECEASED.

STAPLE AND LOCK FOR BAG-FRAMES.

SPECIFICATION forming part of Reissued Letters Patent No. 10,383, dated September 18, 1883.

Original No. 266,201, dated October 17, 1882. Application for reissue filed April 6, 1883.

*To all whom it may concern:*

Be it known that OSCAR REICHENBACH, now deceased, at the time of his decease a citizen of the United States, residing at Newark, in the county of Essex and State of New Jersey, did invent new and useful Improvements in Staples and Locks for Bag-Frames, of which the following is a specification.

This invention consists in providing the lock-box extension with holes through which are passed staples, which are secured directly to the frame, whereby the same fastening secures both the lock-box and the handle to the frame.

The drawings show the combination, with a bag-frame, of a lock-box provided with extensions, having in their outer surfaces semicircular recesses near their ends, two staples provided with semicircular recesses in their inner surfaces, and with pins adapted to project through holes in the extensions of the lock-box and in the bag-frame, and two loops or links for the support of the handle placed into the recesses between the staples and the extensions of the lock-box, so that said staples form the connection between the links, the lock-box, and the bag-frame. The staples, together with their pins, are cast solid of brass or other suitable metal. The advantage of having recesses formed both in the surface of the lock-box and in the surfaces of the staples is that the staples can be made to sit down quite low on the lock-box extension, and, rising but slightly above the upper surface of the extension, they cause the device to assume an ornamental appearance.

This invention is illustrated in the accompanying drawings, in which—

Figure 1 represents a sectional side view when the parts are connected. Fig. 2 is a perspective view of the different parts when disconnected on a larger scale than the previous figure. Fig. 3 is a perspective inverted plan view of one of the staples detached.

Similar letters indicate corresponding parts.

In the drawings, the letter A designates the frame for a traveling bag, satchel, or other article of a similar nature. B is the lock-box, the base of which is provided with extensions *a a*, and in the upper surface of these extensions, near their ends, are formed simicircular recesses *b* (best seen in Fig. 2) and two holes, *c c*, which correspond to holes *d d* in the frame A. The lock-box is secured to the frame by means of staples C C, each of which is provided in its inner surface with a semicircular recess, *e*, and with two pins, *f f*, which project from its inner surface—one on each side of the recess *e*. When the lock-box is adjusted on the frame in the proper position the pins *f f* of the staples C C can be passed through the holes *c c* in the extensions of the lock-box and through the holes *d d* in the frame A; and by the recesses *b e* in the extensions of the lock-box and in the staples respectively circular sockets are formed for the reception of rings or links D, which form the connection between the handle and the bag-frame. When the pins *f f* are riveted on the inside of the frame A, they connect the staples, the lock-box, the frame, and the links D firmly together, and considerable labor is saved in the manufacture of the bags or satchels. The staples C, together with the pins *f f*, are cast solid, the recesses *e* being formed during the operation of casting, so that no further labor is required in fitting up or constructing the staples, with the exception of cleaning their outer surfaces and plating the same with nickel, or otherwise, if desired.

What I claim as new, and desire to secure by Letters Patent, is—

1. The combination of the bag-frame, the lock-box, and the staples C, provided with pins *f*, passing through the lock-case extension, thus securing the ends of the handle and lock-case to the bag-frame, substantially as described.

2. In combination with the bag-frame, the lock-box extension having perforated ends, the staples having pins passing through said perforations and attached to the bag-frame, and the rings D, held beneath the staple-crowns, substantially as described.

3. The combination, with a bag-frame and a handle therefor, of a lock-box applied to the frame of the bag, and devices, substantially as described, attached to the ends of the handle, passed thence through the lock-box extension and through the bag-frame, substantially as set forth.

4. In combination with the bag-frame, the lock-box provided with extensions, and the handle connections having rivet-pins passing through the lock-box extensions and frame, securing the lock-box-handle connections and frame, as described.

5. In a traveling-bag, the combination, with the frame, of a lock-box provided with extensions having perforated ends and staples passing through such perforations, whereby the lock-box and handle are secured to the frame by a single fastening device, substantially as shown and described.

6. The combination, with the frame A, of the lock-box provided with extensions having in their outer surfaces semicircular recesses near their ends, two staples provided with semicircular recesses in their inner surfaces, and with pins adapted to project through holes in the extensions of the lock-box and in the bag-frame, and two links intended for the support of the handle and placed into the sockets between the staples and the extensions of the lock-box, all constructed to operate substantially as and for the purpose shown and described.

R. C. JENKINSON. [L. S.]

Witnesses:

WM. C. HAUFF,

W. HAUFF.